United States Patent [19]

Kuchenbecker et al.

[11] 4,361,338
[45] Nov. 30, 1982

[54] TOY CAR WITH PEDAL DRIVE

[76] Inventors: Heinz Kuchenbecker, Parkstr. 17; Hans J. L. Kuchenbecker, Parkstr. 15; Rolf Kuchenbecker, Parkstr. 17, all of D-5657 Haan 2, Fed. Rep. of Germany

[21] Appl. No.: 173,662

[22] Filed: Jul. 29, 1980

[30] Foreign Application Priority Data

Nov. 24, 1979 [DE] Fed. Rep. of Germany ....... 2947365

[51] Int. Cl.³ .......................... B62K 5/04; B62M 1/02
[52] U.S. Cl. ............................... 280/1.11 R; 280/259; 296/177; D21/78; D21/80
[58] Field of Search ............... 280/259, 1.1 R, 1.11 R, 280/1.11 A, 1.12, 1.21, 87.01, 87.02 R; 296/177; D21/76, 78, 80; 46/221

[56] References Cited

U.S. PATENT DOCUMENTS

| D. 164,067 | 7/1951 | Sebel | D21/76 |
| 1,562,244 | 11/1925 | Morrill | 280/1.11 R |
| 1,586,942 | 6/1926 | Bried | 280/1.1 R |
| 2,181,665 | 11/1939 | Messamore | 280/259 |
| 2,633,378 | 3/1953 | Kraeft | D21/78 X |
| 2,793,045 | 5/1957 | Schuler | 280/1.21 |
| 2,988,370 | 6/1961 | Bertram | 280/1.1 R |
| 3,151,872 | 10/1964 | Weber | 280/1.11 R |
| 3,224,137 | 12/1965 | Wright et al. | 46/221 |
| 3,902,739 | 9/1975 | Kimura | 280/1.11 R |

FOREIGN PATENT DOCUMENTS

| 50933 | 6/1911 | Austria | 280/87.01 |
| 1505935 | 2/1970 | Fed. Rep. of Germany . |
| 1505936 | 4/1970 | Fed. Rep. of Germany . |
| 1605771 | 3/1971 | Fed. Rep. of Germany . |
| 2932915 | 9/1980 | Fed. Rep. of Germany . |
| 2939867 | 4/1981 | Fed. Rep. of Germany . |
| 2162356 | 8/1981 | Fed. Rep. of Germany . |
| 2026328 | 2/1980 | United Kingdom | 280/87.02 |

Primary Examiner—John A. Pekar
Attorney, Agent, or Firm—Ernest F. Marmorek

[57] ABSTRACT

A three-wheeled toy car for children has a single unitary car body that gives the external impression as if it were for a four-wheeled undercarriage, the latter extending laterally entirely underneath the car body.

4 Claims, 8 Drawing Figures

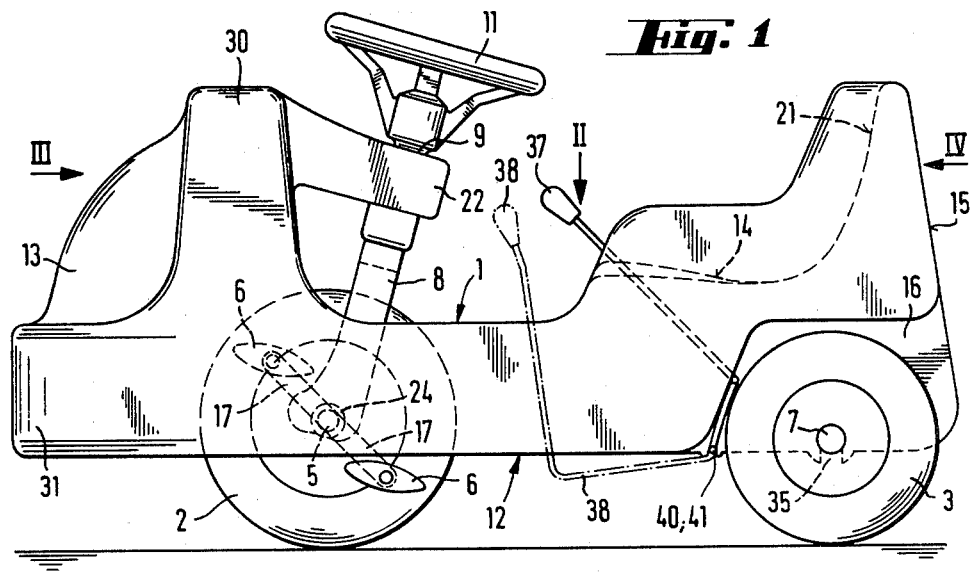
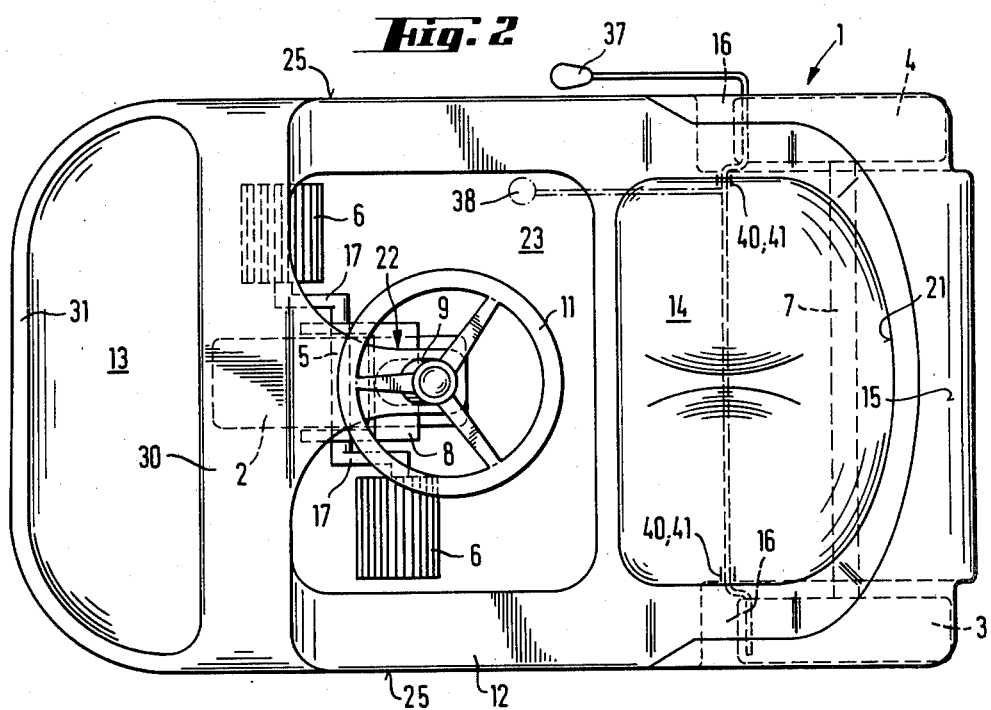

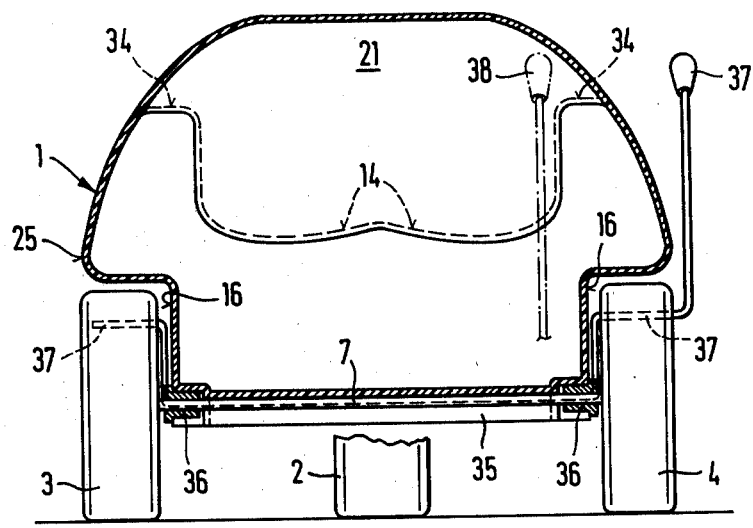
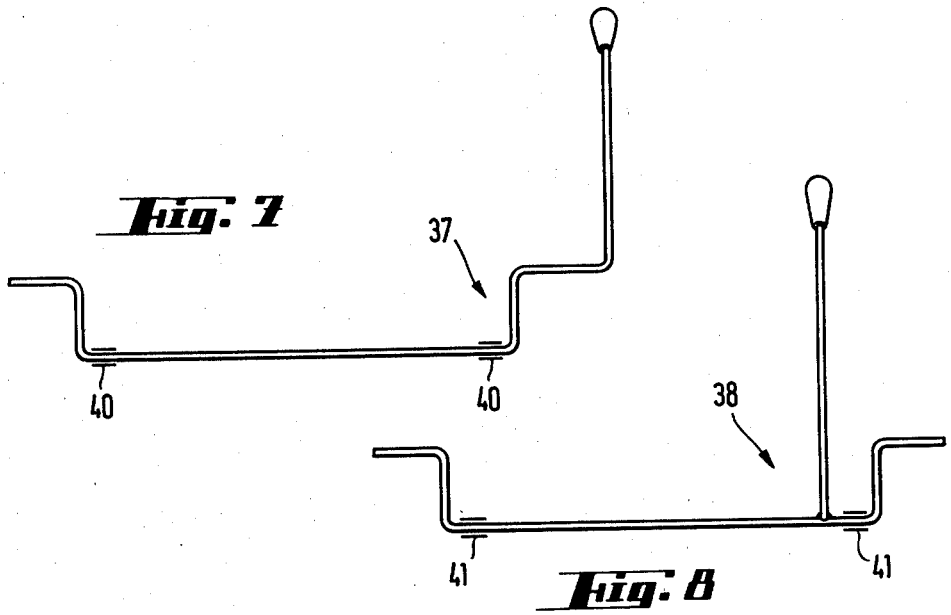

TOY CAR WITH PEDAL DRIVE

BACKGROUND OF THE INVENTION

This invention relates to a toy car for children with a pedal drive and a seat in the car body section. Vehicles of this type are normally used for children from two to six years of age according to international practice.

It is known in the art to operate toy vehicles of this type as open tricycles and also to manufacture children's or toy vehicles with a more or less open car body on a four-wheel undercarriage. The particular drawback affecting these two vehicle types resides in the fact that even though the tricycle, namely a vehicle that comprises one front wheel and two rear wheels, offers a great deal of maneuverability, it fails to give the visual impression of an automobile. The rear wheels are normally idling on the rear axle.

Other versions are also known in the art wherein the propelling force is transmitted to the rear wheels.

Vehicles with four wheels and a steering mechanism of appropriately more complicated design, however, do not offer and provide the surprising maneuverability of the three-wheel drive concept.

Vehicles with four wheels must have a corresponding wheel base between the front and rear wheels so that the overall length of the vehicle is relatively long. This great overall length may have been the reason why such four-wheel vehicles are being bought to a restricted extent only because their use is self-prohibitory in normal living quarters and their outdoor use also would require wide spaces to be available.

The many years' efforts by those skilled in the art to develop a car-like (automobile-like) toy vehicle for infants have failed to date. The reasons for this failure have been mainly that selection of a conventional drive comprising pedal and chain and compliance with ruling safety provisions to provide specified safety distances and spacings have led to vehicle dimensions of especially great lengths, which render their use by infants well nigh impossible.

To resolve these problems, a compromise is being adopted which consists in using a pushrod drive and a mostly light-gauge cover hood in a car body configuration; but this is susceptible to fracture. While vehicles of this type seem to be suitable for infant use, they are basically inferior to conventional tricycles or four-wheel vehicles due to their restricted maneuverability and their uncomfortable drive.

Another problem that a four-wheel car body poses is its stability, especially where plastics blow-moulding methods must be used for the production thereof. To make it technically economical, the blow-moulding process must be adapted to produce substantially equal wall thicknesses. Such demands are not compatible with the normally rough handling by children and concomitant exposure to strain due to collision of two vehicles or collision with obstacles. These have been factors that kept the trade from simply combining the three-wheel drive (while providing the foot space required therefor) with a four-wheel car body because space problems would multiply in such a combination due to the applicable high torsional forces.

SUMMARY OF THE INVENTION

It is an object of the present invention to provide a small-size toy vehicle and to combine the advantages of a three-wheel vehicle with those of an automobile-like car, while avoiding the drawbacks thereof.

Broadly speaking, the foregoing and other objects of the invention are attained by the provision of a toy car with pedal drive and a car body integrated seat; the car body has the external configuration of a four-wheeled vehicle, but actually houses a three-wheeled undercarriage internally. This three-wheeled undercarriage is fitted with the front wheel drive which is preferably equipped with a free-wheeling hub. The car body is preferably of the open type and such that the entire car body structure is component-free from about hip level on up and along its sides.

BRIEF DESCRIPTION OF THE DRAWINGS

In the accompanying drawings,

FIG. 1 is a side elevational view of a toy vehicle according to the present invention;

FIG. 2 is a plan view of the toy vehicle;

FIG. 6 is a sectional view, taken on the line VI—VI of FIG. 5;

FIG. 7 is a schematic elevational view of the brake linkage outside the car body; and FIG. 8 is a schematic elevational view, similar to FIG. 7, but embodying a modified brake linkage inside the car body.

DESCRIPTION OF THE PREFERRED EMBODIMENT

Figure 3:
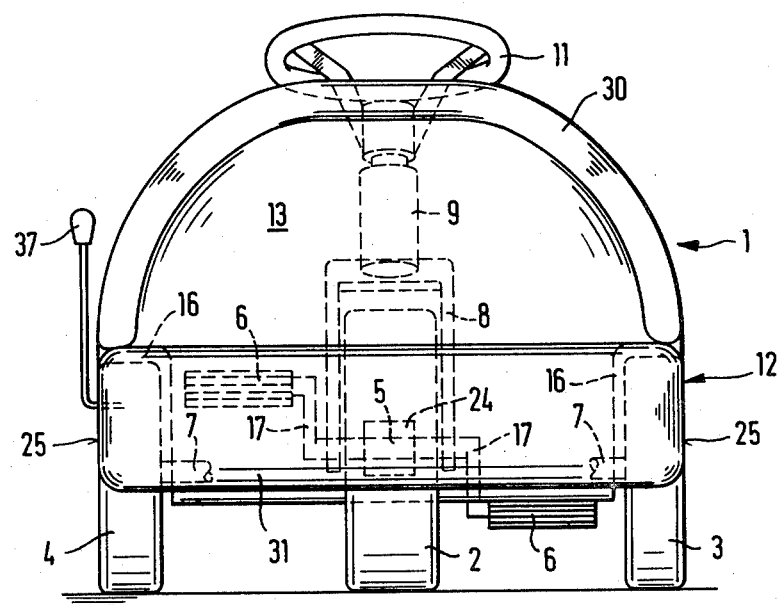
FIG. 3 is a front elevational view thereof.
Figure 4:
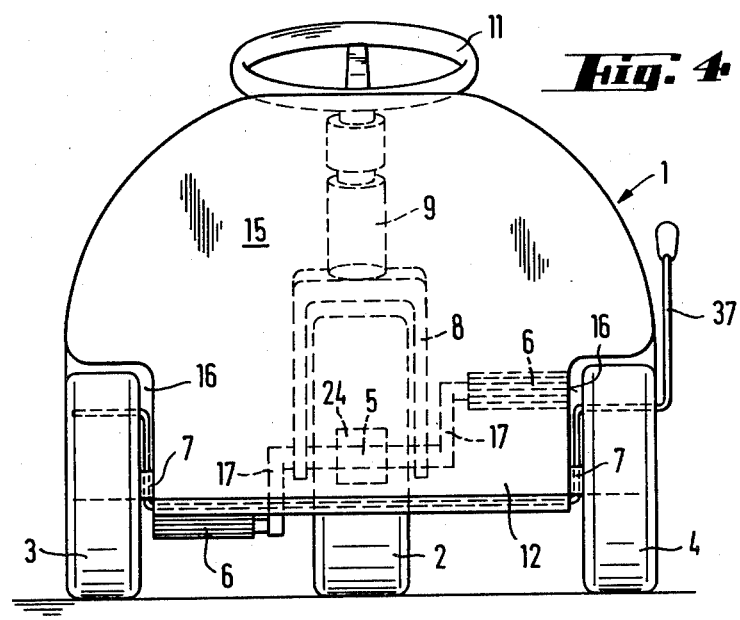
FIG. 4 is a rear elevational view thereof.
Figure 5:
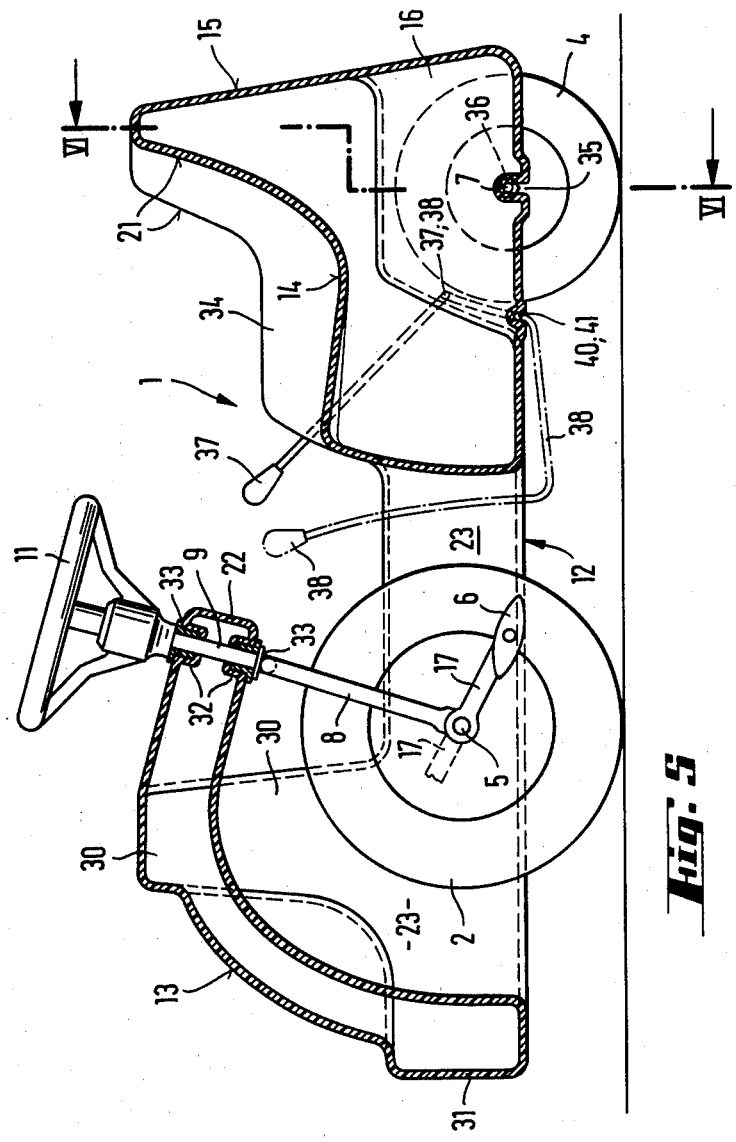
FIG. 5 is a longitudinal central sectional view thereof.

In carrying the invention into effect in one of the embodiments which has been selected for illustration in the accompanying drawings and for description in this specification, as can be seen from FIGS. 1 to 5, the car body 1 is a single unitary body that externally gives the impression of an automobile with four wheels. The three-wheel undercarriage 2, 3, 4 is fitted with a pedal drive 5, 6, 17 supported in a fork member 8. In a manner known per se this pedal drive is preferably provided with a freewheeling hub to keep injuries away from the children's legs and feet when the drive pedals 6 are not operated. The steering fork 8 is mounted in a bearing bracket 22 together with the steering column 9 which carries a steering wheel 11 at the upper extremity thereof.

It is advantageous to provide the three-wheel undercarriage 2, 3, 4 with a front wheel pedal drive including a freewheeling mechanism 24 which is preferably fitted with a change hub to render it effective in both forward and backward travel.

The front wheel pedal drive offers and permits a surprisingly high degree of mobility and maneuverability so that the vehicle is completely controllable already by infants having an age of two years and over. The favorable combination of a three-wheel undercarriage with a four-wheel car body, as previously mentioned, is such that due to the rectangular configuration of the pedal compartment 23, the pedals can be moved in the absence of any obstruction to the legs or feet.

The freewheeling arrangement 24, especially in the design incorporating the freewheeling change hub generally known in the art, protects the driving infant from suffering injuries to its legs when the treading movements are suddenly stopped, but nevertheless permits the vehicle to be driven forward or backward.

According to a particular feature of the invention the car body 1 is of open design such that about from the hip level on the car body is completely free from any structural parts upwardly and along the sides thereof. The rear deck 15 of the car body 1 has an upward inclination towards the interior of the car body as viewed from the wheels 3, 4, which facilitates the so-called pushing drive by a playmate.

Setting out from a stabilizing bead 30 and as an integral part thereof a bracket 22 is provided interiorly of and in the centerline of the car body 1 to accommodate the steering column 9 in the forward portion of the vehicle. As can be seen more clearly from FIGS. 1 and 5, this bracket 22 is part of a shell-like car body configuration. The bead 30 is such as to transmit to the entire car body 1 those forces which originate from the steering column 9 and which are applied thereto. To achieve this, the bracket 22 is provided with one upper and one lower cavity 32 to receive bearing bushings 33 for the steering column 9.

To intensify the visual impression of a four-wheel vehicle (automobile), wheels 3, 4 are disposed in wheel boxes 16 integrally formed in the car body 1 an flush with the sides 25 thereof.

For ready access to the foot room and simultaneously for convenient access to the pedal compartment the car body 1 is provided with entrance openings which are located ahead of the seat area as viewed in forward direction of travel.

The seat 14 has a shape contoured for a child's body, with lateral arm rests 34 and a curved backrest 21 which extends into the said lateral arm rests in a curvature.

The forward portion of the toy car has a tapered "radiator" area or section 13 as a particular visually attractive feature to which juxtaposed there is a "bumper" element 31 in the form of a horizontal bead. This provides particularly favorable protection to the very area which appears to be most critical from a dynamic strain point of view, namely the top and the sides of the forward part of the vehicle, by the stabilizing bead 30 and the bumper element 31 having the form of a horizontal bead.

Even though the car body 1 has a large number of curvatures, it can be most economically produced by the blow-moulding method, provided, however, that the blow-moulded component be not apertured at all, or if absolutely necessary in such places only which are not exceptionally critical. This general design principle has been definitely followed in establishing the required connection to the rear axle as may be seen particularly from FIGS. 1, 5 and 6 where an open-bottom type groove 35 is formed which permits the rear axle 7 to be pushed thereinto. Two bearing sleeves 36 are disposed in the groove 35 to connect the rear axle 7 to the car body 1.

The principle of not aperturing and hence weakening the car body for reasons of stability can also be adopted for the arrangement of the brake linkage 37 in the way as shown in FIGS. 6 to 8.

The rear axle 7 and the groove 35, as well as the steering fork 8 and the bracket 22 of the body 1 and the bushings 33 cooperate to form support means for the body 1 on the undercarriage.

The brake handle of the linkage 37 is arranged outside the vehicle at one of the sides thereof in one case, but it is nevertheless possible also to arrange the brake linkage 38 inside the car body 1 if expedient, as can be gathered from FIGS. 1, 6 and 8, as this part of the body is exposed to dynamic strain to a lesser degree. The brake linkage 37 or 38, however, is arranged in friction bearings 40 and 41 in either case.

The operation of the toy vehicle will be clear from the above description.

Having thus described the invention, what we claim as new and desire to be secured by Letters Patent, is as follows:

1. A toy car, comprising in combination,
   a single unitary car body of blow-molded plastic material substantially open on top, including an integral interior seat, and having a substantially rectangular contour, and the external configuration of a four-wheeled toy car,
   an undercarriage including
      three wheels including a front wheel each revolvable about a normally substantially horizontal axis,
      a steering mechanism operable for steering said front wheel about an upright axis, and including a steering column, said car body including a stabilizing bead extending upwardly from said car body and comprising an integral bracket in the interior of said car body accommodating said steering column in a forward position of the vehicle,
      a pedal drive including freewheeling means, mounted for energizing said front wheel to propel it on the ground, and
   support means disposed intermediate said three wheels and said car body supporting said car body off the ground,
   said undercarriage extending laterally entirely underneath said car body.

2. A toy car according to claim 1, wherein said bracket for the steering column is provided with one upper and one lower cavity for receiving bearing bushings.

3. A toy car, comprising in combination,
   a single unitary car body of blow-molded plastic material substantially open on top defining a tapering front "radiator" section and a "bumper" element in the form of a horizontal bead integral with said front section, and including a stabilizing bead connected to said radiator laterally and thereabove, and integral therewith, and an integral interior seat, said car body having a substantially rectangular contour, and the external configuration of a four-wheeled toy car,
   an undercarriage including
      three wheels including a front wheel each revoluble about a normally substantially horizontal axis,
      a steering mechanism operable for steering said front wheel about an upright axis,
      a pedal drive including freewheeling means, mounted for energizing said front wheel to propel it on the ground, and
   support means diposed intermediate said three wheels and said car body supporting said car body off the ground,
   said undercarriage extending laterally entirely underneath said car body.

4. A toy car, comprising in combination,
   a single unitary car body of blow-molded plastic material substantially open on top, free of any components from about the hip level of a seated rider on up, and on its sides, and including an integral interior seat, having a substantially rectangular contour, and being formed as a contoured seat with lateral arm rests, a curved backrest which extends into said lateral arm rests, said car body having the external configuration of a four-wheeled toy car, a pedal compartment of rectangular shape being provided in said car body, the car body sides being provided with entrance openings located ahead of the seat area as viewed in the forward direction of travel, said car body defining a tapered front "radiator" section and a "bumper" element in the form of a horizontal bead integral with said front section, and further comprising a stabilizing bead connected to said radiator laterally and thereabove, and integral therewith, an undercarriage comprising three wheels including a front wheel each revoluble about a normally substantially horizontal axis, two of said wheels being substantially coaxially mounted as rear wheels, said rear wheels being disposed in wheel boxes integrally formed in the car body and substantially flush with the sides thereof, said car body having a rear deck inclined upwardly towards the interior of the car body as viewed from said rear wheels, a steering mechanism including a steering column, operable for steering said front wheel about an upright axis, said car body including a stabilizing bead extending upwardly therefrom, and comprising an integral bracket in the interior of said car body accommodating said steering column in a forward portion of the vehicle, and being provided with one upper and one lower cavity for receiving bearing bushings, a pedal drive including freewheeling means, mounted energizing said front wheel to propel it on the ground, support means disposed intermediate said three wheels and said car body supporting said car body off the ground and including a portion of said steering mechanism, and a rear axle for the rear wheels, a groove being provided in the lower part of said car body operable to receive said rear wheels, said support means including three support points connecting the entire undercarriage comprising said three wheels, said pedal drive, said steering mechanism and said rear axle to the car body, and a brake linkage arranged outside said car body, said undercarriage extending laterally entirely underneath said car body.

* * * * *